United States Patent
Noll et al.

(10) Patent No.: US 9,222,228 B2
(45) Date of Patent: Dec. 29, 2015

(54) ROAD FINISHING MACHINE AND METHOD OF OPERATING A ROAD FINISHING MACHINE

(75) Inventors: Tobias Noll, Roschbach (DE); Ralf Weiser, Ladenburg (DE)

(73) Assignee: JOSEPH VOGELE AG, Ludwigshafen/Rhein (DE)

(*) Notice: Subject to any disclaimer, the term of this patent is extended or adjusted under 35 U.S.C. 154(b) by 722 days.

(21) Appl. No.: 13/196,399

(22) Filed: Aug. 2, 2011

(65) Prior Publication Data
US 2012/0031724 A1    Feb. 9, 2012

(30) Foreign Application Priority Data
Aug. 6, 2010    (EP) ..................... 10008249

(51) Int. Cl.
*E01C 19/48*    (2006.01)

(52) U.S. Cl.
CPC ............ *E01C 19/48* (2013.01); *B60W 2300/17* (2013.01); *F16D 2500/3166* (2013.01); *F16D 2500/50883* (2013.01)

(58) Field of Classification Search
CPC ............... F16D 2500/1112; F16D 2500/30403
See application file for complete search history.

(56) References Cited

U.S. PATENT DOCUMENTS

| | | | | |
|---|---|---|---|---|
| 4,263,997 A | * | 4/1981 | Poore | 192/103 R |
| 4,484,653 A | | 11/1984 | Horikoshi et al. | |
| 4,838,755 A | | 6/1989 | Johnson et al. | |
| 5,778,330 A | * | 7/1998 | McKee | 701/62 |
| 5,819,870 A | * | 10/1998 | Braun | 180/305 |
| 6,152,275 A | * | 11/2000 | Fischer et al. | 192/82 T |
| 6,161,393 A | * | 12/2000 | Bascobert | 62/156 |
| 7,086,226 B2 | | 8/2006 | Oguri | |

(Continued)

FOREIGN PATENT DOCUMENTS

| | | |
|---|---|---|
| DE | 20316481 | 3/2005 |
| JP | S57205233 A | 12/1982 |

(Continued)

OTHER PUBLICATIONS

Office Action which issued Mar. 17, 2015 in corresponding Japanese Application No. 2011-164459, with English translation thereof.

(Continued)

*Primary Examiner* — Ramya Burgess
*Assistant Examiner* — Mark Manley
(74) *Attorney, Agent, or Firm* — Fish & Richardson P.C.

(57) ABSTRACT

In a road finishing machine with a primary power plant and a power transfer to a hydraulic pump and/or a generator for supplying power to hydraulically or electrically operated functional components, the power transfer comprises at least one clutch that can be optionally engaged and disengaged, and a clutch control device is provided by means of which, depending on at least the operator guidance and/or a detected clutch loading situation, a disengagement delay ($\Delta t$) automatically overriding the operator guidance can be set, and/or a clutch shifting number restriction can be set by means of a detection interval (dt) moving along in time. The clutch control device actually engages, within the frame of the respective overriding control strategy, the clutch only after the disengagement delay ($\Delta t$) has lapsed, if no operation command to the contrary is present, and/or keeps the clutch first engaged, although an operation command to the contrary is present.

11 Claims, 7 Drawing Sheets

(56) References Cited

U.S. PATENT DOCUMENTS

Figure 1:
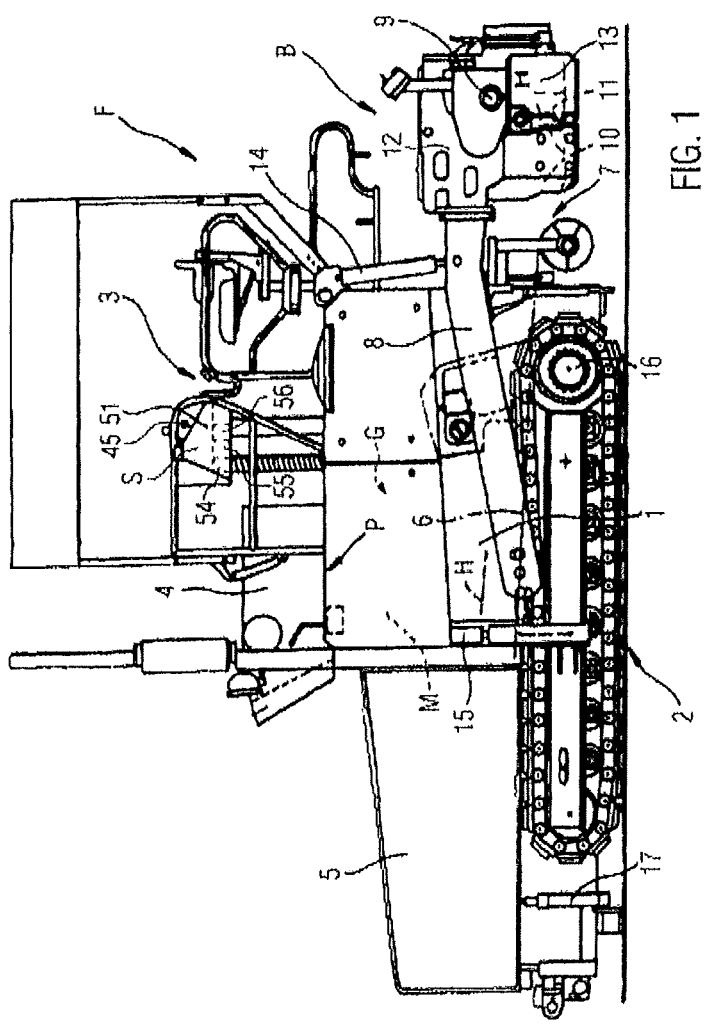

| | | |
|---|---|---|
| 7,103,463 B2 | 9/2006 | Sah |
| 7,416,068 B2 | 8/2008 | Ray et al. |
| 7,669,393 B2 * | 3/2010 | Park et al. .................. 56/10.2 R |
| 2004/0011154 A1 | 1/2004 | Dybro |
| 2005/0036894 A1 | 2/2005 | Oguri |
| 2008/0296121 A1 | 12/2008 | Miyazaki et al. |
| 2009/0036271 A1 * | 2/2009 | Brand et al. .................. 477/181 |

FOREIGN PATENT DOCUMENTS

| | | |
|---|---|---|
| JP | S62007931 A | 1/1987 |
| JP | H06-15822 B2 | 3/1994 |
| JP | H10072806 A | 3/1998 |
| JP | H10252012 A | 9/1998 |
| JP | 2001018670 A | 1/2001 |
| JP | 2004084470 A | 3/2004 |
| JP | 2008291897 A | 12/2008 |

OTHER PUBLICATIONS

Notice of Opposition filed Jul. 8, 2015 against counterpart European Application No. 2 420 621 B1, with English Translation.
Company brochure of Joseph Vogele AG entitled "Super 1804 High Mobility for High Performance" (12 pages) with English Translation.

* cited by examiner

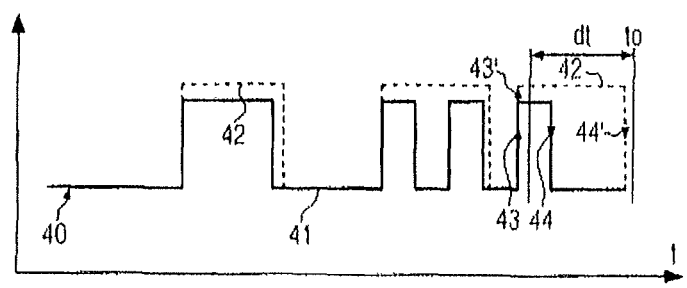

ROAD FINISHING MACHINE AND METHOD OF OPERATING A ROAD FINISHING MACHINE

The invention relates to a road finishing machine having a primary power plant comprising an internal combustion engine and a power transfer to at least one hydraulic pump and/or a generator for supplying power to hydraulically or electrically actuated functional components in the road finishing machine and/or at least one screed of the road finishing machine, and wherein the power transfer device has at least one optionally engaging and disengaging clutch, and a clutch control device for shifting the at least one clutch in response to operator input and a method of operating the machine The internal combustion engine, in most cases a diesel engine, of the primary power plant of a road finishing machine is operated when the road laying machine is in operation (laying work drive and transport drive) to ensure that the road finishing machine and its functional components are ready for working at any time. Independent of whether the functional components require hydraulic or electric energy in operation, power is constantly consumed. As a result, superfluous drag losses due to the road finishing machine's readiness for working and undesired high mechanical loads occur, increasing the fuel consumption and thus also burdening the environment.

In view of increasing efforts to relieve the burden on the environment and to avoid the waste of non-renewable energy carriers, and also to obtain longer service lives, efforts are already being made to improve the energy balance of road finishing machines. The European patent application bearing the File Number 09 006 978.2-2422 with earlier seniority suggests providing at least one optionally engaging and disengaging clutch in the power transfer to disengage at least one hydraulic pump and/or the generator via the clutch in operational situations of the road finishing machine where one functional component actually does not need any power, to reduce drag losses, save fuel and relieve the environment. Due to reduced mechanical loads, this results in increased service life for at least some components of the road finishing machine's equipment, and moreover a considerable improvement of the energy balance. The at least one clutch is operator-guided or disengaged or engaged by a control system in accordance with the detected demand. The clutch can be disposed upstream of a pump transfer gear, in the pump transfer gear or in a power output of the pump transfer gear and is shifted, for example, hydraulically. As the power to be transmitted by the at least one clutch is considerable in a machine like a road finishing machine, frequent shifting operations lead to critical clutch loading situations due to frequent quickly changing demands. Such demands might compromise the required road finishing machine's readiness for working.

The object underlying the invention is to improve a road finishing machine and a method of operating the road finishing machine such that the required readiness for working is ensured in an efficient manner.

The set object is achieved with the present invention as described below.

In the road finishing machine, operator inputs or operation commands lead to the actuation of functions at the machine. In the present case, the road finishing machine control system detects operation commands and decides whether the user input is part of a function group that can be switched on and off by a clutch. To implement the actuation of the function desired by the operator without affecting functionality, present operation commands must lead to an engagement and thus to a connection of the drive component (typically a hydraulic pump). As soon as the operation command for the corresponding function group is cancelled, the drive component can be switched off. This results in engaging and disengaging operations required by operation commands which, however, can be overridden by the clutch control device.

In the road finishing machine, at least in certain operational situations, the clutch control device takes on the control of the shifting operations of the at least one clutch. In these situations the clutch control device automatically sets a disengagement delay and/or a clutch shifting number restriction overriding the operator guidance, depending at least on the operator guidance and/or a detected clutch loading situation, such that the road finishing machine's constant readiness for working is ensured either in the laying work drive or in the transport drive. Nonetheless, some clutch shifting operations only suitable in case of demand are suppressed in view of protecting the clutch. Thus, one can more efficiently take into account operational situations in a retrospective approach or in an approach related to the current situation. Essentially, the clutch control device will leave the clutch engaged for a longer time or/and more often than it would be necessary for the respective operational situation of the road finishing machine. The clutch control device can here cause all clutch shifting operations, and sometimes override direct or indirect operation commands only occurring due to the operational situation.

According to the method, the clutch control device disengages the clutch automatically only after the set disengagement delay has elapsed, unless any operation command to the contrary is present then, and/or it keeps the clutch automatically engaged during the set clutch shifting number restriction although an operation command to the contrary is present. While in this manner only a compromise is achieved, for example for saving fuel, accompanying measures can be taken to minimize at least drag losses when the at least one clutch is not immediately disengaged despite an operation command, or when it is kept engaged during the period of several engaging and disengaging operations ordered by operation commands. In this manner, permanent readiness for working is ensured which is moreover not compromised by an overloading of the clutch.

In a suitable embodiment of the road finishing machine, the clutch control device adjusts the disengagement delay and/or the clutch shifting number restriction depending on the previous and/or future and/or present clutch loading situation.

To be able to properly take into consideration the operator guidance as well as the loading situation, in a preferred embodiment, the clutch control device comprises a detection section and an evaluation section for at least one of the following quantities representing the clutch loading situation and the operational situation: at least one operation command resulting in an engagement or disengagement, and/or changes of the operational behavior of the internal combustion engine due to the operation or non-operation of at least one functional component, and/or at least one measured temperature value, and/or at least one response reaction of the at least one hydraulic pump or at least one magnet-actuated control valve to an operation command.

It can be furthermore suitable for the clutch control device to comprise a time-related recording section for points in time and/or numbers of clutch shifting operations, in particular the first engagement operation, within a fixed detection interval. If, for example, an engaging operation is already detected within the detection interval, no further engaging operation must be performed within its detection interval; the clutch control device rather keeps the clutch engaged until the recorded first engagement operation leaves the detection interval and then no more operation command to engage is present. The detection interval can be designed variably. It can be influenced by the total number of shifting operations within a previously specified interval as well as by a procured measured value. For example, if the number of shifting operations rises within one hour above a value specified by the clutch manufacturer, the clutch control device extends the detection interval or sampling interval, respectively, and thus the shifting frequency of the clutch is reduced. As an alternative or in addition, an excessively high oil temperature can also reduce the number of shifting operations, e.g. by extending the sampling interval. For this, several input quantities or detected changes of state can also be combined. Conversely, the detection interval can also be shortened again.

Suitably, the disengagement delay is adjusted to be either constant or variable. The clutch shifting number restriction can also be adjusted to be either constant or variable. Variation can be performed linearly, progressively or in declining fashion.

In a suitable embodiment of the road finishing machine, the power transfer comprises at least one power dividing pump transfer gear which at least drives the at least one hydraulic pump and preferably the generator. The at least one clutch can be arranged between the primary power plant and the pump transfer gear, or in the pump transfer gear or at an output of the pump transfer gear.

In a suitable embodiment, at least two parallel clutches are even provided which are shifted by the clutch control device individually or together. Here, the at least two clutches are controlled analogously to the control of only one clutch, where, however, the respective engaging and disengaging operations caused by the clutch control device are at least triggered by operation commands for different functional components or groups of functional components. For example, at least one clutch is provided for functional components to be actuated rather frequently or at short intervals, such as functional components comprising hydraulic cylinders, and at least one further clutch is provided for functional components to be actuated at longer intervals, such as travel drives, material transport units, material distribution units, tamper, compaction and vibration units, heating means, and the like.

In a suitable embodiment, the at least one hydraulic pump is a variable displacement pump whose output can be adapted to the varying power required by a functional component. The hydraulically actuated functional components can each comprise at least one hydraulic motor, preferably a variable displacement motor, or at least one hydraulic cylinder. At least the variable displacement pump and/or the variable displacement motor m make it possible to minimize drag losses or pump losses by internal control if the associated clutch is still kept engaged although the functional component does not need any more power.

In another embodiment, an electrically actuated functional component which is supplied by the generator comprises an electric heating means and/or an electric motor. Here, too, the drag resistance generated by the generator can then be minimized by electronic control if the functional component does not need any more power despite the clutch being kept engaged.

In a particularly suitable embodiment, the clutch is actuated electrically, hydraulically, mechanically or pneumatically, and it is preferably embodied as multi-plate clutch or plate clutch, and the detected measured temperature value transmitted to the clutch control device represents the gear oil temperature in the pump transfer gear and/or the oil temperature in a hydraulic circuit of the clutch. The measured temperature value is a very meaningful quantity for assessing the clutch loading situation. If appropriate, measured temperature values can be detected at different points and optionally averaged.

In a further important embodiment, for at least one hydraulically actuated functional component, an unpressurized circulation circuit is provided in its hydraulic circuit which can be activated for the corresponding function group when no operation command is present. In this manner, unnecessary drag losses or pump losses are then minimized both when the clutch is engaged and disengaged.

Figure 2:
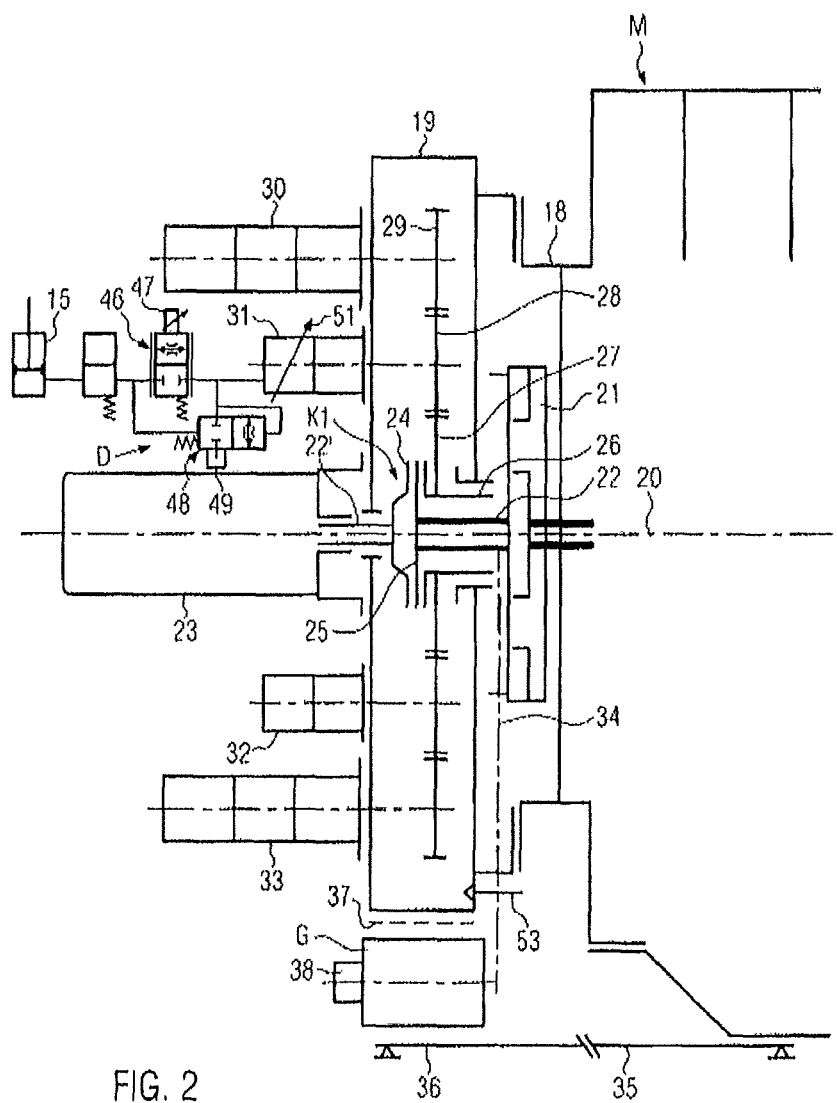
Figure 3:
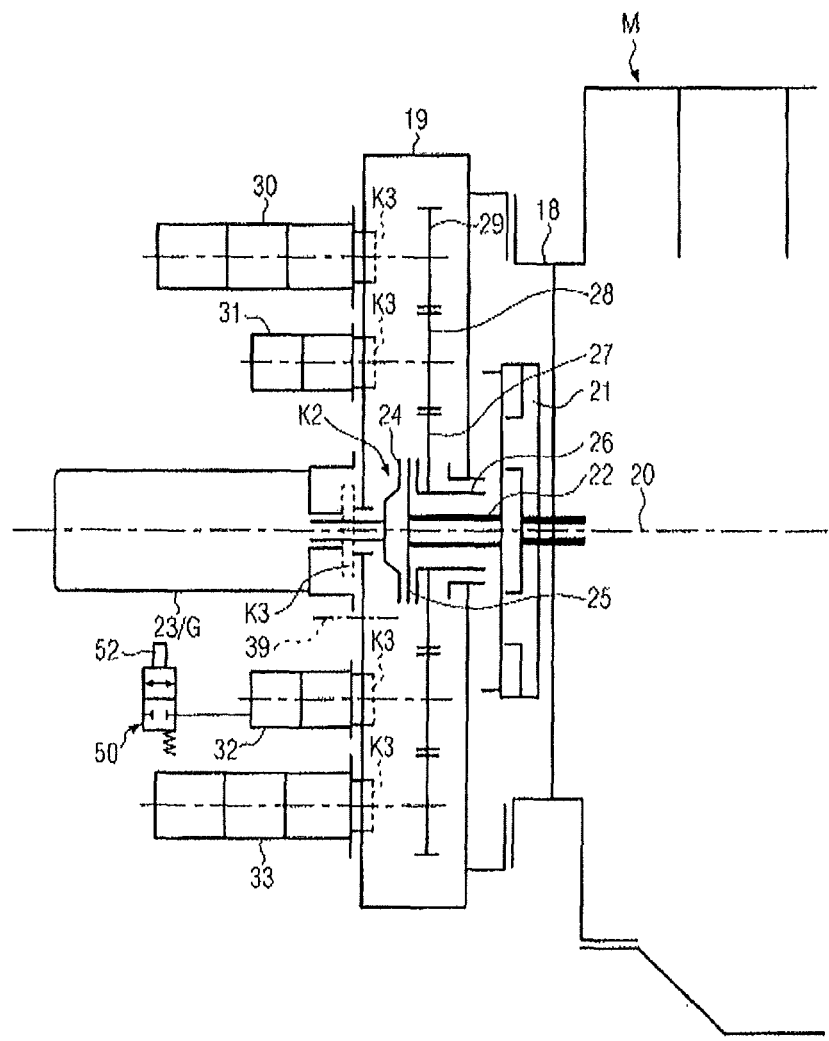
Figure 4:
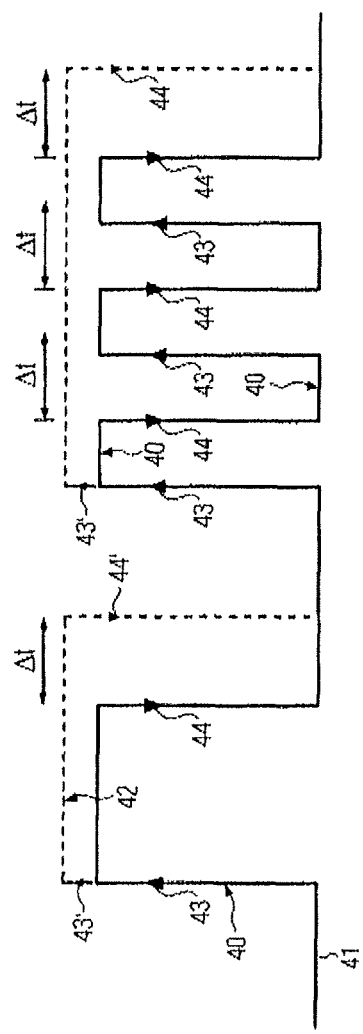

Embodiments of the subject matter of the invention are illustrated with reference to the drawings. In the drawings:

FIG. 1 shows a schematic side view of a road finishing machine with hydraulically and/or electrically actuated functional components, FIG. 2 shows a schematic transmission diagram of the power transfer from a primary power plant of the road finishing machine to at least one hydraulic pump and/or a generator, where an engaging and disengaging clutch is contained in the power transfer, FIG. 3 shows a schematic transmission diagram of another embodiment of the power transfer with several clutches, FIG. 4 shows a diagram of clutch shifting operations under the influence of an automatic clutch control device of the road finishing machine, for example in FIG. 1, in the present case using a disengagement delay, and FIGS. 5-11 show here the same diagram of FIG. 4 of clutch shifting operations under the influence of the clutch control device using a clutch shifting number restriction at different points in time in a consecutive sequence.

A self-driving road finishing machine F in FIG. 1 for preparing traffic areas, for example of hot bituminous laying material or concrete laying material during a slow laying work drive can also perform transport drives at an essentially higher transport drive speed. The road finishing machine F comprises, at a chassis 1, a travelling gear 2, here a track gear (as an alternative a wheel gear which is not shown) which is driven by at least one hydraulic motor 16. A bunker 5 for laying material is arranged in the front region of the chassis 1. A longitudinal conveyor unit 6 extends inside the chassis from the bunker 5 to a material distribution unit 7 disposed at the rear. The longitudinal conveyor unit 6 can be driven, for example, by hydraulic motors (not shown), and it can optionally comprise an electric heating device H. The material distribution unit 7 driven by at least one hydraulic motor and optionally adjustable in its height by hydraulic cylinders is located in front of a screed B towed by the road finishing machine F at beams 8, the screed B evening and/or compacting the laying material. The beams 8 are hinged at the chassis 1 and their height can be adjusted by means of hydraulic cylinders 15. Furthermore, hydraulic cylinders 14 are hinged at the beams 8 and supported at the chassis 1 and, e.g. during the transport drive, hold the screed B in the lifted position which is shown in FIG. 1, but can also be actuated during the laying work drive in certain operational phases. On the top of the chassis 1, there is a driver stand 3 with an operator control panel 51, for example a main drive switch 45, and a clutch control device S, preferably a computerized clutch control device S which includes at least one detection section 54 and one evaluation section 55, and optionally also a time-related recording section 56. Furthermore, there are disposed under a cover 4, a primary power plant P with an internal combustion engine M, typically a diesel engine, and a generator G for supplying at least electric heating devices H in the road finishing machine F and/or in the screed B, and/or for supplying functional components comprising electric motors. The operator control panel 51 communicates with a road finishing machine control (not shown).

The screed B has, for example, a basic screed 12 connected with the beams 8 and laterally traversable extendable screeds 13, each equipped with tampers 11, 10 and/or pressing strips (not shown) and vibration means for finishing plates on the bottom side, where the tampers 10, 11, the pressing strips and/or the finishing plates can comprise electric heating devices H. The extendable screed parts 13 can be shifted by means of hydraulic cylinders 9. As an alternative, the screed B can also only comprise the basic screed 12 alone.

The hydraulic motors, hydraulic cylinders and the electric heating devices and/or electric motors are part of functional components required in the operation of the road finishing machine F, depending on the respective operational situation, in different numbers or at different times and form, together with the generator G and hydraulic pumps driven by the primary power plant P, functional assemblies of the road finishing machine and/or of the screed B which draw power from the primary power plant P. Further functional components are, for example, side walls of the bunker 5 which can be adjusted by the hydraulic cylinders 17.

In FIG. 2, the drive diagram of several functional components is indicated, where, however, only the respective hydraulic pumps and the generator are shown, not, however, the hydraulically or electrically actuated functional components themselves, and neither any hydraulic oil reservoir, gear oil reservoir, or the like. The internal combustion engine M in FIG. 2 has a clutch or flywheel housing 18 to which a pump transfer gear 19 is flanged. A crankshaft 20 of the internal combustion engine M drives a driven train 22, for example via a torsionally flexible clutch 21, which leads to a clutch K1 at the pump transfer gear 19 (or, as it is shown, within the latter). The clutch K1 can be shifted between an engaged and a disengaged position hydraulically, pneumatically, electrically or mechanically. In FIG. 2, the clutch K1 is arranged between the driven train 22 and a coaxial extension 22' of the driven train 22. The extension 22' leads to a hydraulic pump 23 for travel drives, in the shown embodiment centrally flanged to the pump transfer gear 19, the travel drives for example including the hydraulic motors 16. The hydraulic pump 23 can be a fixed displacement pump or a variable displacement pump. The hydraulic motors are optionally variable displacement motors.

The clutch K1 is, for example, a hydraulically actuated multi-plate clutch and has at least one clutch part 25 permanently connected with the driven train 22, the clutch part being, in the engaged position of the clutch K1, connected in a torque-proof manner with a clutch part 24 to the extension 22', and simultaneously with a hollow shaft 26. The hollow shaft 26 drives several gear stages 27, 28, 29 in the pump transfer gear 19. The gear stages 27, 28, 29 can drive several hydraulic pumps or hydraulic pump units 30, 31, 32, 33. The generator G is held either at the pump transfer gear 19 (at 37) or with its own bearing 36 in the chassis 1, or at an engine support console 35 of the internal combustion engine M together with the latter, and is driven in FIG. 2 via a drive connection 34 (e.g. a belt drive or a propeller shaft).

If the clutch K1 is engaged in FIG. 2, all gear stages 27, 28, 29, the hydraulic pump 23 and the generator G are driven by the crankshaft 20 of the internal combustion engine. If, however, the clutch K1 is disengaged, at least one hydraulic pump is disengaged from the driven train 22 or the crankshaft 20, in FIG. 2 even the pumps 30 to 33, and also the hydraulic pump 23, as well as the gear stages 27, 28, 29 of the pump transfer gear 19 (no drag load for the internal combustion engine resulting from oil-churning losses or meshing resistance of generated losses). To engage or disengage the clutch K1, an operator can, for example, generate operation commands at the main drive switch 45 which are detected by the clutch control device S and recorded. Finally, the clutch control device S then controls the engagement and disengagement of the clutch K1 depending on at least one operation command and optionally a further detected and evaluated parameter or measured value, respectively, e.g. the temperature of the gear oil in the pump transfer gear 19 or the hydraulic oil in a hydraulic circuit of the clutch K1.

In FIG. 2, a pump 38 is shown as an option at the permanently driven generator G which is also permanently driven and supplies basic functions, e.g. the respectively hydraulically actuated clutch, e.g. the clutch K1 in FIG. 2.

FIG. 3 illustrates various drive diagrams. The driven train 22, which is, in FIG. 3, connected to the crankshaft 20 of the internal combustion engine M via the torsionally flexible clutch 21, here passes through to the hydraulic pump 23 for the travel drives centrally flanged to the pump transfer gear 19, so that the hydraulic pump 23 is permanently driven. The clutch K2 is seated on the continuous driven train 22 and, in the engaged state, drives the gear stages 27, 28, 29 of the pump transfer gear 19 via the hollow shaft 26 and thus the pumps 30 to 33. When the clutch K2 is disengaged, the gear stages 27, 28, 29 and the pumps 30 to 33 are disengaged, while the hydraulic pump 23 is still being driven. The generator G can be either permanently driven as in FIG. 2, or it is even driven by the driven train 22 in combination with the hydraulic pump 23.

In an alternative embodiment to FIG. 3, instead of the hydraulic pump 23, the generator G is flanged to the pump transfer gear 19 and permanently connected to the crankshaft 20 via the driven train 22. In this case, for example the hydraulic pump 23 is connected to a further power output 39 of the pump transfer gear 19. In the disengaged state of the clutch K2, thus the hydraulic pump 23 is also disengaged, while the generator G is permanently driven.

In FIG. 3, another alternative is furthermore indicated in a dashed line in which one engaging and disengaging clutch K3 each, is associated with each hydraulic pump unit (with several pump stages) or each hydraulic pump 30 to 33, and also with the hydraulic pump 23, suitably at the respective output of the pump transfer gear 19. In this case, the clutch K2 can be omitted, and the driven train 22 is permanently connected to the gear stage 27 in the pump transfer gear 19. As an alternative, however, there, too, a clutch K3 could be provided.

As required, via the individual clutches that can be engaged and disengaged individually, in groups or together, all, several or only one of the pumps 30 to 33, 23 can be disengaged. The internal combustion engine M then permanently drives only the driven train 22 and optionally the gear stages 27, 28, 29 of the pump transfer gear 19 and the generator G. In another non-depicted alternative, the generator G could also be optionally disengaged via a clutch, for example when the internal combustion engine M is started and/or run up.

To improve the energy balance of the internal combustion engine M, for starting and optionally in the run-up phase, the clutch K1 in FIG. 2 is changed to the disengaged state, so that all drag loads are disengaged from the crankshaft 20 or the driven train 22, and the internal combustion engine M starts more easily. As soon as the road finishing machine F begins with the laying work drive or the transport drive, the clutch K1 is engaged, so that all functional components are driven. The generator G optionally also runs permanently. In idle phases where no functions at the road finishing machine are active, energy can be saved by disengaging the clutch K1.

In the embodiment in FIG. 3, the clutch K2 is, for example, disengaged for starting and optionally running up the internal combustion engine M, so that the hydraulic pumps 30 to 33 and optionally the hydraulic pump 23 are disengaged, or only the hydraulic pump 23 for the travel drives and the generator G are permanently driven. If the hydraulic pump 23 is centrally flanged to the pump transfer gear 19, as shown, the road finishing machine F can then, in the disengaged state of the clutch K2, perform the transport drive at a high transport speed and a lower fuel consumption as no drag loads of the functional components must be overcome. In contrast, the permanently driven generator G can heat the heating means H to its operating temperature during the standstill of the road finishing machine F before further functional components are connected via the clutch K2. If the hydraulic pump 23 for the travel drives is permanently driven, the road finishing machine F can drive at a high transport speed and low fuel consumption without any superfluous drag loads of further functional components.

If, however, as is indicated in a dashed line in FIG. 3, individually engaging and disengaging clutches K3 are provided in the outputs of the pump transfer gear 19 to the pumps 30 to 33, 23 (the clutch K2 of FIG. 3 can be omitted in this case), each, several or all hydraulic pumps can be connected or disengaged as required. In the transport drive of the road finishing machine F, for example only the clutch K3 to the hydraulic pump 23 for the travel drives is engaged, while the other pumps 30 to 33 remain disengaged. The generator G can then, for example, be also disengaged or run along. For heating the heating means H, the generator can be either driven permanently or via an engaged clutch, while the other hydraulic pumps 30 to 33 still remain disengaged. The individual engaging and disengaging clutches K3 in FIG. 3 permit to drive or disengage each functional component as required and lead to an improvement of the energy balance of the road finishing machine F or the internal combustion engine M, respectively, optionally during starting and/or running up, during the transport drive or for heating up heating means H.

The respective clutch K1, K2, K3 can optionally also be disengaged during interruptions of the laying work drive of the road finishing machine F, e.g. while the supply of fresh laying material is waited for. While the respective clutch K1, K2, K3 can be engaged or disengaged in certain operational situations by the driver by operation commands in the driver stand 3, or by the accompanying personnel at an external control stand at the screed B, engagement and disengagement is suitably performed all-automatically by the clutch control device S of the road finishing machine F evaluating at least the given operation commands. The clutch control device S cooperates here with monitoring and/or detection means for operational situations which require the disengagement or connection of certain drag loads. However, the clutch control device S controls the respective clutch K1, K2, K3 not only in accordance with operation commands or information of the monitoring and/or detection means, but additionally automatically in view of avoiding critical clutch loading situations, where it can override operation commands and is directed by other aspects which will be illustrated below.

Basically, the clutch control device S controls the respective clutch K1, K2, or K3 automatically, but without compromising the road finishing machine's readiness for working during the laying work drive or transport drive. In the automatic clutch control by the clutch control device, all operation commands of an operator are detected. In the evaluation section 54, the operation commands are evaluated. The result of this data processing leads to an automatic disengagement or engagement. If, for example, an operation command to engage is present at the clutch control device S, the clutch control device S engages the corresponding clutch K1, K2 or K3. If the operation command is cancelled, for example by releasing a button or transferring the main drive switch 45 to the zero position, the clutch control device S can disengage the respective clutch K1, K2 or K3, or optionally override or ignore this operation command, respectively. The clutch control device S can optionally take a detected very critical operational situation as a reason for disengaging the respective clutch or keep it disengaged, despite operation commands to the contrary, and generate a fault message to cause the removal of the reason of the very critical operational situation, e.g. the execution of repair or maintenance.

When an operation command to engage is present, the engaging operation must be performed as soon as possible. However, several strategies offer themselves for a disengaging operation. Preferably, the shifting frequency is restricted for thermal loading reasons, e.g. by too frequent clutch shifting operations. To reduce the shifting frequency in case of quickly following operation commands, the clutch is disengaged, for example, only after a previously determined time interval of a disengagement delay (FIG. 4, $\Delta t$). The disengagement delay $\Delta t$ can be a determined constant period of time. However, the disengagement delay $\Delta t$ is suitably even configured to be variable by taking into consideration, in the evaluation section 55, the shifting frequency and/or at least one other measured value which can be detected by sensors. If the clutch control device S detects e.g. an excessively high shifting frequency, it extends the disengagement delay $\Delta t$. If a low shifting frequency is detected over quite a long period of time, the disengagement delay $\Delta t$ can be shortened again, e.g. in steps. Analogously, for varying the disengagement delay $\Delta t$, a sensor signal can be taken into consideration, for example from a temperature signal converter, which signals the gear oil temperature in the pump transfer gear 19 and/or in the hydraulic circuit of the clutch. As temperature rises, the shifting frequency is then reduced by an extension of the disengagement delay $\Delta t$ to prevent a further rise of the oil temperature. If the oil temperature falls, the disengagement delay $\Delta t$ can be shortened. Furthermore, for adjusting the employed disengagement delay $\Delta t$, several input quantities or detected or recorded changes of state can be combined with each other. Procured measured values can be linked to the detected shifting frequency. The disengagement delay $\Delta t$ can be varied linearly, decliningly or progressively. As an alternative or in addition, the clutch control device S can restrict the number of shifting operations within a detection or sampling interval (FIGS. 5-11). For this, points in time of engaging operations are recorded, for example. If, for example, at least one engaging operation is already recorded within this detection interval, each further engaging operation is suppressed, so that the clutch remains engaged until the first recorded engaging operation has left the detection interval. If, after the detection interval, either no operation command or an operation command to disengage already given before is present, the clutch control device S disengages the clutch. If, after the recorded engaging operation has left the detection interval, an operation command to engage is present, the clutch is engaged again.

Suitably, the quantity of the detection or sampling interval is automatically varied by the clutch control device S. The quantity can vary depending on the total number of shifting operations within a previously specified interval, and also depending on detected measured values. If, for example, the shifting frequency rises, within one hour, above a value specified as being critical by the clutch manufacturer, the clutch control device S increases the detection or sampling interval to reduce the shifting frequency. As an alternative or in addition, a detected temperature value can also be taken into consideration, so that in case of an excessively high oil temperature, the number of shifting operations is reduced by extending the interval. Here, too, several input quantities can be taken into consideration in combination, for example the number of recorded shifting operations and diverse measured values, preferably measured temperature values.

In summary, the clutch control device S can adjust a constant or variable disengagement delay $\Delta t$ as in FIG. 4, and/or a detection or sampling interval having a fixed or variable period for the clutch shifting number restriction dt in FIGS. 5 to 11. The detection interval is retrospective e.g. from the current point in time $t_0$ and passes in synchronism with the operating procedure.

To minimize the shifting frequency of at least one clutch, it is suitable to keep functional components connected which are often and only in operation for a very short time. Saving of energy can then be ensured in these functional components, for example, by an unpressurized circuit D (indicated in FIGS. 2 and 3). The unpressurized circuit D is suitably always activated when the clutch control device S also disengages the clutch. The unpressurized circuit D is in each case only activated until the next operation command to engage is present, or the respective clutch is engaged by the clutch control device S. These functional components in the road finishing machine include, for example, those which are operated with hydraulic cylinders 17, 15, 14, 9.

In contrast, in the laying work drive, functional components, such as the travel drives, material transport units, material distribution units, heating means, tamper, pressing strip and vibration units, are usually operated for long periods of time. The at least one clutch associated with them is disengaged by the clutch control device relatively immediately after a corresponding operation command is present, or it is only kept engaged if the detected clutch loading situation requires this. If more than one clutch is provided, the clutch control device can control the several clutches in the same manner as it controls one clutch. The respective clutch engaging or disengaging operation then may be triggered by an actuation of different function components or operation commands to actuate different functional components. The respective clutch engaging or disengaging operation, however, is then executed corresponding to a control routine which is determined to be expedient in the current situation.

As a possible option, an operator can also manually engage the respective clutch directly, for example by a lever. The clutch could also be actuated via a separate switch on the control panel 51 by manual operation.

The operation commands taken into consideration by the clutch control device S cannot only originate directly from the operator but, as an alternative or in addition, be derived, for example, by evaluating the speed characteristic of the internal combustion engine M, e.g. influenced by functional components. If the speed of the internal combustion engine M exceeds a predetermined threshold, the clutch control device S engages the clutch. If, however, the speed of the internal combustion engine falls below a predetermined threshold, the clutch control device disengages the clutch. As an alternative, a pivoting angle of a variable displacement pump could be also utilized for deriving an operation command, for example via the solenoid valve control flows used for adjusting the pivoting angle. This can be determined, for example, via the control flow of a proportional magnet of a proportional valve. Even with a flicker control valve, an operation command for an engaging or disengaging operation could be derived by means of the position of the control valve, e.g. also by measuring the controlled flows.

FIG. 2 for example illustrates that the hydraulic pump 31 is a variable displacement pump (symbolically indicated by arrow 51), and that optionally at least one proportional solenoid control valve 46 with a proportional magnet 47 is employed for actuating, for example, the hydraulic cylinder 15. Here, an unpressurized circuit D with a valve 48, for example configured as pressure scale, is provided which then lets the delivery of the hydraulic pump 31 flow to the reservoir 49 without pressure when the hydraulic cylinder 15 does not need any power or the proportional solenoid valve 46 is in its shut-off position. It is furthermore schematically indicated in FIG. 2 that at least one temperature sensor 53 is arranged in the pump transfer gear 19 which, as temperature signal converter, signals the gear oil temperature to the clutch control device S. In FIG. 3, a flicker solenoid valve 50 for actuating the non-depicted functional component is associated to the hydraulic pump 32 by way of example, whose flicker magnet 52 is monitored, for example, with respect to the switching current, so that the clutch control device S can derive a fictitious operation command to actuate or switch off the functional component. As an alternative, the respective valve could also be monitored by a distance sensor in view of its position.

In the diagram in FIG. 4, a series of curves 40 shown as a solid line represents clutch shifting operations which would be arranged by operation commands (43: operation command to engage; 44: operation command to disengage), and be actually suitable for the operation of the road finishing machine F. The respective clutch can be changed between a disengaged state 41 and an engaged state 42. An actual engaging operation is indicated by an arrow 43', while an actual disengaging operation is indicated by an arrow 44', in each case caused by the clutch control device S (dashed lines). As soon as the operation command 43 for the first engaging operation has been generated, the clutch control device S implements the latter as soon as possible (arrow 43'). The clutch will be in the engaged state 42 until the following disengaging operation is ordered by an operation command 44. While the clutch control device S detects the operation command 44, it suppresses a shifting operation by setting the disengagement delay $\Delta t$ from the point in time when operation commands 44 occur; once the disengagement delay $\Delta t$ has lapsed, the clutch control device S initiates the disengaging operation (arrow 44').

The one shifting operation (43', 44') until the disengagement delay $\Delta t$ has lapsed is detected. At a later point in time, an operation command 43 for the next engaging operation is present again which the clutch control device S immediately implements as engaging operation (arrow 43'). The clutch control device S first reacts to the next operation command 44 of a disengaging operation with the setting of the disengagement delay $\Delta t$, i.e. the clutch is kept engaged. As another operation command 43 orders an engaging operation before the lapse of the engagement delay $\Delta t$, the clutch control device S will not disengage the clutch but wait for the next operation command 44 for a disengaging operation to then set again the disengagement delay $\Delta t$. The same will happen in the next engaging operation ordered by an operation command 43 before the lapse of the disengagement delay $\Delta t$, so that the clutch will not be disengaged, but the clutch control device S will set again the disengagement delay $\Delta t$ when the, for the moment last, operation command 44 for a disengaging operation occurs. As then no further operation command 43 is present, the clutch control device S finally disengages the clutch with the disengaging operation (arrow 44') after the disengagement delay Δt has lapsed. In FIG. 4, the disengagement delay Δt each of the same duration is adjusted. As an alternative, the period of the disengagement delay Δt, however, could also be shortened or extended, for example depending on the clutch loading situation. The influence of the clutch control device S for actually engaging or disengaging the clutch is indicated by dashed lines, in FIG. 4 using the disengagement delay Δt, while using a clutch shifting number restriction with a sampling interval dt in FIGS. 5 to 11, as mentioned.

In the diagrams in FIGS. 5 to 11, the clutch control device S employs, as an alternative to the disengagement delay Δt according to FIG. 4, the control strategy of a clutch shifting number restriction using a sampling interval dt extending from the current point in time $t_0$ with a fixed or variable (linearly or progressively or decliningly variable) period into the past. The two strategies could also be employed in addition or alternately.

The solid series of curves 40 also indicates in FIGS. 5 to 11 the shifting states actually required by the operation input or operation or operation commands 43, 44, e.g. as in FIG. 4. The operation command 43 is a signal to engage. The operation command 44 is a present signal to disengage. The shifting states required by the operation, however, are overridden by the clutch control device S with actual engaging and disengaging operations (arrows 43', 44'). In FIGS. 5 to 11, the sampling interval is represented at different, consecutive current points in time (each $t_0$).

Figure 5:
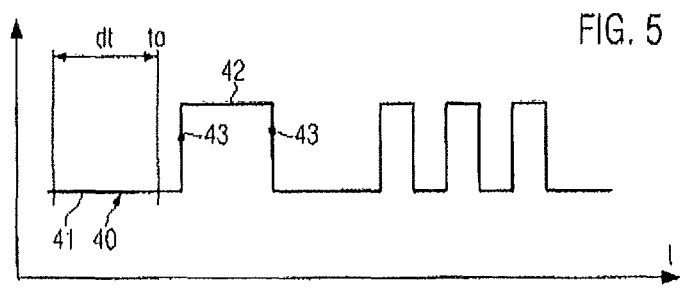
Figure 6:
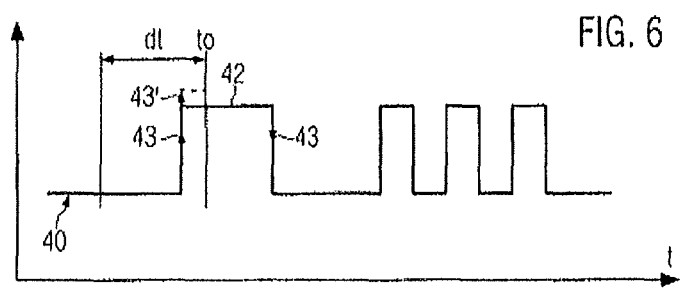
Figure 7:
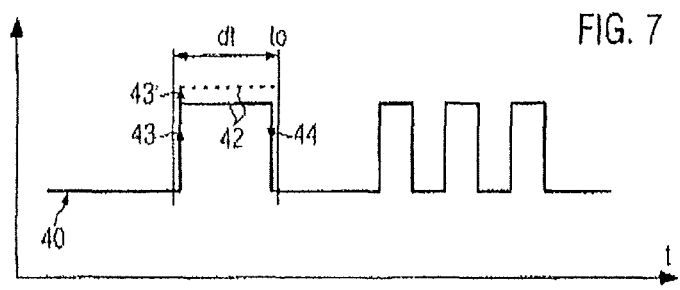
Figure 8:
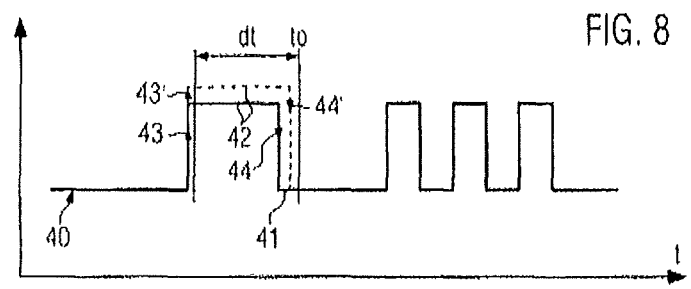
Figure 9:
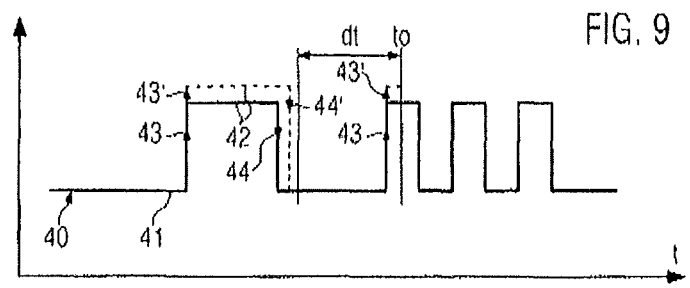
Figure 10:
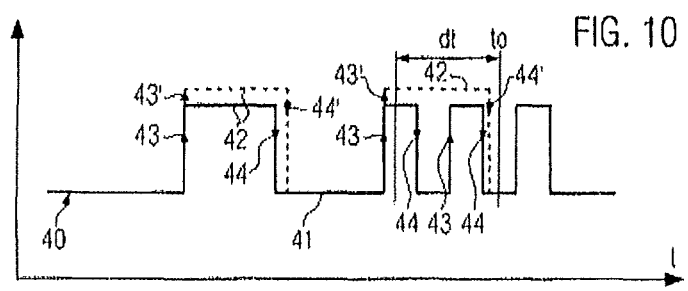

In FIG. 5, no required shifting operations are yet present in the detection interval dt. All supposed fictitious operation commands 43, 44 are still in the future. Only in FIG. 6, the operation command 43 to engage is present in the detection interval dt. The clutch control device S immediately implements this operation command 43 by the engaging operation (arrow 43') (engaged state 43). The first engaging operation (arrow 43') within the detection interval dt is stored as signal. If, as represented in FIG. 7, the operation command 44 is present as a signal for disengagement, where the detection interval dt has moved along over time, the stored signal of the engaging operation is still within the detection or sampling interval dt, so that the clutch control device S overrides the operation command 44 and keeps the clutch engaged. Only in FIG. 8, the detection interval dt has correspondingly moved further over time, so that the clutch control device S causes, simultaneously with the exit of the stored signal of the engaging operation (arrow 43') from the detection interval dt, the disengaging operation (arrow 44') (disengaged state 41). If, as represented in FIG. 9, a new operation command 43 to engage occurs after a certain time, the clutch control S triggers the engaging operation (arrow 43'). If the sampling interval dt moves further over time (FIG. 10), and if in this time, apart from the then again stored signal of the previous engaging operation 43', further operation commands 44 to disengage or a further operation command 43 to engage occur, where the stored signal of the engaging operation is still within the detection interval dt, the clutch control device S overrides all operation commands 44 to disengage until the point in time $t_0$ when the stored signal of the engaging operation 43' has left the detection interval dt. Only then is the disengaging operation 44' triggered, if then no more operation command 43 is present. If in FIG. 11, another operation command 43 and thus a signal for engagement is received again at a later point in time, the clutch control S evaluates the signal and immediately triggers the engaging operation (arrow 43'). Although then the operation command 44 to disengage is present within the detection interval dt, the clutch control device S overrides the signal until the stored signal of the previous engaging operation (arrow 43') has left the detection interval dt. Only then, the disengaging operation (arrow 44') is actually accomplished.

Within the series of curves 40, the clutch is not, as ordered, engaged four times and disengaged four times, but for example only three times, where the operating safety of the road finishing machine F is not compromised at any time.

The invention claimed is:

1. A road paver comprising:
 a power plant;
 a hydraulic pump or generator;
 a power transfer train coupling the power plant to the hydraulic pump or generator, wherein the power transfer train comprises a clutch that is selectively shiftable between an engaged state and a disengaged state; and
 a clutch control device for shifting the clutch between the engaged state and the disengaged state,
 wherein the clutch control device is configured to:
 receive a first command specifying that the clutch be shifted from the engaged state to the disengaged state;
 determine a command history for a predetermined length of time prior to a present time, wherein the command history comprises at least the first command;
 select, based on the command history, an earliest received command for the predetermined length of time prior to the present time;
 determine whether the earliest received command specifies that the clutch be shifted from the disengaged state to the engaged state; and
 upon determining that the earliest received command does not specify that the clutch be shifted from the disengaged state to the engaged state, shift the clutch from the engaged state to the disengaged state and
 wherein the power transfer train further comprises a power dividing pump transfer gear for driving the hydraulic pump or the generator, and wherein the clutch is disposed between the power plant and the pump transfer gear, or in the pump transfer gear, or at an output of the pump transfer gear and the road paver comprises at least two clutches, where at least one of the clutches is configured to actuate at first intervals, and where at least one of the clutches is configured to actuate at second intervals, where the first intervals are shorter than the second intervals.

2. The road paver of claim 1, wherein the predetermined length of time is adjustable, and wherein the clutch control device is configured to adjust the predetermined length of time based on a current operator guidance, a previous operator guidance, or a clutch load.

3. The road paver of claim 2, wherein the clutch control device is configured to adjust the predetermined length of time constantly.

4. The road paver of claim 2, wherein the clutch control device is configured to adjust the predetermined length of time variably.

5. The road paver of claim 2, wherein the clutch control device is configured to adjust the predetermined length of time linearly, progressively, or decliningly.

6. The road paver of claim 1, wherein the hydraulic pump is a variable displacement pump, and wherein a hydraulically actuated functional component associated with the hydraulic pump comprises a hydraulic motor.

7. A method of operating a road paver having a power transfer train coupling a power plant to a hydraulic pump or generator, wherein the power transfer train comprises a clutch that is selectively shiftable between an engaged state and a disengaged state, the method comprising:
- receiving a first command specifying that a clutch of the road paver be shifted from an engaged state to a disengaged state;
- determining a command history for a predetermined length of time prior to a present time, wherein the command history comprises at least the first command;
- selecting, based on the command history, an earliest received command for the predetermined length of time prior to the present time;
- determining whether the earliest received command specifies that the clutch be shifted from the disengaged state to the engaged state; and
- upon determining that the earliest received command does not specify that the clutch be shifted from the disengaged state to the engaged state, shifting the clutch from the engaged state to the disengaged state and
- wherein the power transfer train further comprises a power dividing pump transfer gear for driving the hydraulic pump or the generator, and wherein the clutch is disposed between the power plant and the pump transfer gear, or in the pump transfer gear, or at an output of the pump transfer gear and the road paver comprises at least two clutches, where at least one of the clutches is configured to actuate at first intervals, and where at least one of the clutches is configured to actuate at second intervals, where the first intervals are shorter than the second intervals.

8. The method of claim 7, further comprising adjusting the predetermined length of time based on a current operator guidance, a previous operator guidance, or a clutch load.

9. The method of claim 8, wherein adjusting the predetermined length of time comprises adjusting the predetermined length of time constantly.

10. The method of claim 8, wherein adjusting the predetermined length of time comprises adjusting the predetermined length of time constantly variably.

11. The method of claim 8, wherein adjusting the predetermined length of time comprises adjusting the predetermined length of time linearly, progressively, or decliningly.

* * * * *